US009393755B2

(12) United States Patent
Fukumoto et al.

(10) Patent No.: US 9,393,755 B2
(45) Date of Patent: Jul. 19, 2016

(54) MULTILAYERED HEAT-RECOVERABLE ARTICLE, WIRE SPLICE, WIRE HARNESS, AND METHOD FOR PRODUCING ADHESIVE FOR MULTILAYERED HEAT-RECOVERABLE ARTICLE

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Ryota Fukumoto, Osaka (JP); Satoshi Yamasaki, Osaka (JP); Yasutaka Emoto, Osaka (JP)

(73) Assignees: SUMITOMO ELECTRIC INDUSTRIES, LTD., Osaka-shi (JP); SUMITOMO ELECTRIC FINE POLYMER, INC., Sennan-gun, Osaka (JP)

(*) Notice: Subject to any disclaimer, the term of this patent is extended or adjusted under 35 U.S.C. 154(b) by 0 days.

(21) Appl. No.: 14/890,479

(22) PCT Filed: Mar. 24, 2015

(86) PCT No.: PCT/JP2015/058894
§ 371 (c)(1),
(2) Date: Nov. 11, 2015

(87) PCT Pub. No.: WO2015/151928
PCT Pub. Date: Oct. 8, 2015

(65) Prior Publication Data
US 2016/0089847 A1    Mar. 31, 2016

(30) Foreign Application Priority Data
Mar. 31, 2014  (JP) ................................ 2014-074566

(51) Int. Cl.
*B32B 1/08*    (2006.01)
*B32B 7/12*    (2006.01)
(Continued)

(52) U.S. Cl.
CPC ... *B32B 1/08* (2013.01); *B32B 7/12* (2013.01); *B32B 27/08* (2013.01); *B32B 27/16* (2013.01);
(Continued)

(58) Field of Classification Search
CPC ............ B32B 1/08; B32B 7/12; B32B 27/08; B32B 27/16; B32B 27/34; B32B 2307/736; H02G 3/0462; H02G 3/0481; H02G 15/1806; H02G 15/043; H01B 17/58; H01B 3/18
See application file for complete search history.

(56) References Cited

FOREIGN PATENT DOCUMENTS

| JP | H05-247426 A | 9/1993 |
| JP | H06-218873 A | 8/1994 |

(Continued)

*Primary Examiner* — Michael C Miggins
(74) *Attorney, Agent, or Firm* — Drinker Biddle & Reath LLP

(57) ABSTRACT

An object of the present invention is to provide a multilayered heat-recoverable article in which an adhesive layer easily flows during heat shrinkage to ensure adhesiveness with an adherend and does not flow out from a base material layer after heat shrinkage, and a wire splice and a wire harness that include a tube formed by thermally shrinking such a multilayered heat-recoverable article. The multilayered heat-recoverable article (1) according to the present invention includes a cylindrical base material layer (10), and an adhesive layer (11) formed on an inner circumferential surface of the base material layer. The adhesive layer (11) is formed of a resin composition that contains a polyamide as a main component and that does not substantially contain an inorganic filler. The resin composition is cross-linked by irradiation with ionizing radiation. A shear viscosity of the adhesive layer (11) at 150° C. is 300 Pa·s or more at a shear rate of 0.01 s$^{-1}$ and 200 Pa·s or less at a shear rate of 100 s$^{-1}$. The wire splice and the wire harness according to the present invention includes a tube formed by thermally shrinking the multilayered heat-recoverable article (1).

8 Claims, 5 Drawing Sheets

(51) Int. Cl.
  B32B 27/08   (2006.01)
  B32B 27/16   (2006.01)
  B32B 27/34   (2006.01)
  H02G 3/04    (2006.01)
  H02G 15/18   (2006.01)
  H01B 17/58   (2006.01)
  H01B 3/18    (2006.01)
  H02G 15/04   (2006.01)

(52) U.S. Cl.
  CPC  *B32B 27/34* (2013.01); *H01B 3/18* (2013.01); *H01B 17/58* (2013.01); *H02G 3/0462* (2013.01); *H02G 3/0481* (2013.01); *H02G 15/043* (2013.01); *H02G 15/1806* (2013.01); *B32B 2307/736* (2013.01)

(56) References Cited

FOREIGN PATENT DOCUMENTS

| | | |
|---|---|---|
| JP | 2000-500405 A | 1/2000 |
| JP | 2000-129042 A | 5/2000 |
| WO | WO-2014/054409 A1 | 4/2014 |

MULTILAYERED HEAT-RECOVERABLE ARTICLE, WIRE SPLICE, WIRE HARNESS, AND METHOD FOR PRODUCING ADHESIVE FOR MULTILAYERED HEAT-RECOVERABLE ARTICLE

TECHNICAL FIELD

The present invention relates to a multilayered heat-recoverable article, a wire splice, a wire harness, and a method for producing a multilayered heat-recoverable article.

BACKGROUND ART

Heat-recoverable articles such as heat-shrinkable tubes and heat-shrinkable caps that have heat shrinkability in the radial direction are used in covering for, for example, protection, insulation, waterproofness, and corrosion prevention of a connected portion of insulated electric wires, a wiring terminal, a metal tube, or the like. For example, when a connected portion of insulated electric wires is covered with a heat-shrinkable tube and heated, the heat-shrinkable tube shrinks so as to conform to the shape of the connected portion and comes in close contact with the connected portion. Thus, the heat-shrinkable tube can protect the connected portion. In the case where high adhesiveness is required for a connecting portion for the purpose of achieving waterproofness or the like, a multilayered heat-recoverable article that includes an adhesive layer formed on an inner circumferential surface of a cylindrical base material layer is used.

The adhesive layer of such a multilayered heat-recoverable article is formed by using a hot-melt adhesive containing an ethylene-vinyl acetate copolymer (EVA), an ethylene-ethyl acrylate copolymer (EEA), a polyamide, or the like. Such a multilayered heat-recoverable article is produced by respectively forming an outer base material layer and an adhesive layer formed on the inner circumferential surface of the base material layer by extrusion molding so as to have a tubular shape, then increasing the diameter of the resulting tube under heating, and conducting cooling to fix the shape of the tube. After the extrusion molding, the base material layer may be cross-linked by irradiation with ionizing radiation (refer to, Japanese Unexamined Patent Application Publication No. 2000-129042).

Adhesion of such a multilayered heat-recoverable article to an adherend such as an insulated electric wire is performed by, for example, conducting heating in a state where the multilayered heat-recoverable article is arranged so as to cover the outer circumference of the adherend. When the multilayered heat-recoverable article is heated, the base material layer thermally shrinks and the adhesive layer fluidizes at the same time. At this time, the fluidized adhesive layer fills the gap between the adherend and the heat-shrinkable base material layer. Accordingly, by solidifying the adhesive layer by the subsequent cooling, the multilayered heat-recoverable article is brought into close contact with the adherend.

CITATION LIST

Patent Literature

PTL 1: Japanese Unexamined Patent Application Publication No. 2000-129042

SUMMARY OF INVENTION

Technical Problem

An adhesive for the multilayered heat-recoverable article is required to have a high fluidity at the time of heat shrinkage so as to be in close contact with a recess of the adherend or the like without a gap. However, if the fluidity is excessively high, the adhesive flows even when heating is not performed, and the adhesive may flow out from the base material layer with time.

Accordingly, an adhesive for a multilayered heat-recoverable article preferably has thixotropy (thixotropic property) in which the viscosity decreases when a shear stress is applied, and the viscosity recovers when the shear stress is removed.

It is known that thixotropy can be imparted to an adhesive by adding a filler to the adhesive to form a network formed of a resin between filler particles. However, in the case of such thixotropy exhibited by addition of a filler, when a shear is once applied and the viscosity decreases, the network formed of the resin is broken. Accordingly, it takes a long time until, after the shear stress is removed, the network formed of the resin is reconstructed and the viscosity recovers. Therefore, imparting thixotropy to an adhesive for a multilayered heat-recoverable article by addition of a filler may be insufficient in some cases.

The present invention has been made in view of the circumstances described above. An object of the present invention is to provide a multilayered heat-recoverable article in which an adhesive layer easily flows during heat shrinkage to ensure adhesiveness with an adherend and does not easily flow out from a base material layer after heat shrinkage, and a wire splice and a wire harness that include a tube formed by thermally shrinking such a multilayered heat-recoverable article. In addition, another object of the present invention is to provide a method for producing an adhesive whose viscosity decreases and which flows during application of a shear stress, and whose viscosity recovers immediately after removal of the shear stress, the adhesive being used for a multilayered heat-recoverable article.

Solution to Problem

A multilayered heat-recoverable article according to an embodiment of the present invention includes a cylindrical base material layer, and an adhesive layer formed on an inner circumferential surface of the base material layer, in which the adhesive layer is formed of a resin composition that contains a polyamide as a main component and that does not substantially contain an inorganic filler, the resin composition is cross-linked by irradiation with ionizing radiation, and a shear viscosity of the adhesive layer at 150° C. is 300 Pa·s or more at a shear rate of $0.01\ \mathrm{s}^{-1}$ and 200 Pa·s or less at a shear rate of $100\ \mathrm{s}^{-1}$.

A method for producing an adhesive for a multilayered heat-recoverable article according to an embodiment of the present invention, the adhesive being formed of a resin composition that contains a polyamide as a main component and that does not substantially contain an inorganic filler, includes a step of irradiating the resin composition with ionizing radiation, in which a dose of the ionizing radiation is controlled so that a shear viscosity of the adhesive at 150° C. is 300 Pa·s or more at a shear rate of $0.01\ \mathrm{s}^{-1}$ and 200 Pa·s or less at a shear rate of $100\ \mathrm{s}^{-1}$.

Advantageous Effects of Invention

According to the multilayered heat-recoverable article according to an embodiment of the present invention, thixotropy is imparted to a resin composition of an adhesive layer by cross-linking. Therefore, a network formed of a resin is not broken by a shear, and the viscosity recovers, from a state in which the viscosity is decreased by the shear, immediately after a shear stress is removed. With this structure, in the multilayered heat-recoverable article, it is possible to prevent an adhesive from flowing out from immediately after heat shrinkage. In addition, according to the multilayered heat-recoverable article, since the resin composition of the adhesive layer is cross-linked, a network formed of a resin is not broken and it is possible to stably prevent an adhesive from flowing out for a long period of time even in an environment in which a stress is applied from the outside, or the multilayered heat-recoverable article is exposed to a high temperature.

DESCRIPTION OF EMBODIMENTS

Description of Embodiments of Present Invention

Figure 1:
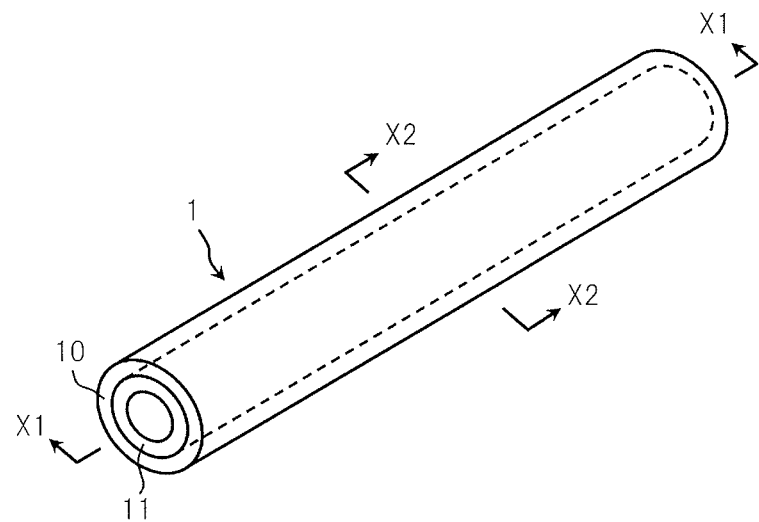
FIG. 1 is a schematic perspective view illustrating a multilayered heat-recoverable article according to an embodiment of the present invention.

A multilayered heat-recoverable article according to an embodiment of the present invention includes a cylindrical base material layer, and an adhesive layer formed on an inner circumferential surface of the base material layer, in which the adhesive layer is formed of a resin composition that contains a polyamide as a main component and that does not substantially contain an inorganic filler, the resin composition is cross-linked by irradiation with ionizing radiation, and a shear viscosity of the adhesive layer at 150° C. is 300 Pa·s or more at a shear rate of $0.01\ s^{-1}$ and 200 Pa·s or less at a shear rate of $100\ s^{-1}$.

According to the multilayered heat-recoverable article, the resin composition that forms the adhesive layer contains a polyamide as a main component and is cross-linked by irradiation with ionizing radiation, thereby exhibiting thixotropy in which the shear viscosity significantly decreases when the shear rate increases. Accordingly, before heat shrinkage, the adhesive layer of the multilayered heat-recoverable article does not substantially receive a shear stress and thus does not flow out from the base material layer. On the other hand, during heat shrinkage of the base material layer, the adhesive layer is subjected to a shear at a high shear rate and easily deforms, and thus easily adheres to an adherend. In addition, since a network formed by cross-linking of a polyamide is not easily broken by a shear, the viscosity of the adhesive layer recovers immediately after heat shrinkage is finished and a shear stress is removed. Therefore, according to the multilayered heat-recoverable article, it is possible to prevent the adhesive layer from flowing out from the base material layer after heat shrinkage.

The resin composition preferably contains a very low-density polyethylene in an amount of 20% by mass or more. By incorporating a very low-density polyethylene, which has a branched structure and is slightly cross-linked more easily than a polyamide, in the resin composition that forms the adhesive layer, thixotropy of the adhesive layer due to cross-linking is significantly improved. Consequently, the fluidity of the adhesive layer during heat shrinkage and the difficulty of outflow after shrinkage can be further accelerated.

The resin composition preferably contains an ethylene copolymer in an amount of 20% by mass or more. By incorporating an ethylene copolymer, which has a branched structure and is slightly cross-linked more easily than a polyamide, in the resin composition that forms the adhesive layer, thixotropy of the resin composition due to cross-linking is significantly improved. Consequently, the fluidity of the adhesive layer during heat shrinkage and the difficulty of outflow after shrinkage can be further accelerated.

A wire splice according to another embodiment of the present invention includes a plurality of wires each of which includes a conductor and an insulating layer formed on the outside of the conductor, and a tube adhering to a portion where the conductors of the wires are connected to each other, in which the tube is formed by thermally shrinking the multilayered heat-recoverable article. Since the wire splice includes a tube formed by thermally shrinking the multilayered heat-recoverable article, the adhesive layer has thixotropy and does not easily flow out from the base material layer. Accordingly, a state where the tube covers a connected portion of the wires in a close contact state is maintained, and thus the connected portion can be continuously protected.

A wire harness according to another embodiment of the present invention includes a plurality of wires each of which includes a conductor and an insulating layer formed on the outside of the conductor, and a tube adhering to the wires, in which the tube is formed by thermally shrinking the multilayered heat-recoverable article. Since the wire harness includes a tube formed by thermally shrinking the multilayered heat-recoverable article, the adhesive layer has thixotropy and does not easily flow out from the base material layer. Accordingly, a state where the tube is in close contact with the wires to protect the wires can be maintained.

A method for producing an adhesive for a multilayered heat-recoverable article according to another embodiment of the present invention, the adhesive being formed of a resin composition that contains a polyamide as a main component and that does not substantially contain an inorganic filler, includes a step of irradiating the resin composition with ionizing radiation, in which a dose of the ionizing radiation is controlled so that a shear viscosity of the adhesive at 150° C. is 300 Pa·s or more at a shear rate of 0.01 s$^{-1}$ and 200 Pa·s or less at a shear rate of 100 s$^{-1}$.

In the method for producing an adhesive for a multilayered heat-recoverable article, a resin composition containing a polyamide is cross-linked by irradiation with ionizing radiation. Accordingly, it is possible to produce an adhesive for a multilayered heat-recoverable article, the adhesive having suitable thixotropy in which when a shear stress having a high shear rate is applied, the viscosity of the adhesive significantly decreases and the adhesive flows, and, immediately after the shear stress is removed, the viscosity recovers. Accordingly, the adhesive produced by the method for producing an adhesive for a multilayered heat-recoverable article is easily brought into close contact with an adherend, and does not easily flow out after the adhesive is brought into close contact with the adherend.

The dose of the ionizing radiation absorbed by the resin composition is preferably 90 kJ/kg or more. By controlling the absorbed dose of the ionizing radiation to the lower limit or more, the shear viscosity of the adhesive can be in the above range easily and reliably, and suitable thixotropy can be imparted to the adhesive for a multilayered heat-recoverable article.

The ionizing radiation is preferably an electron beam. By using an electron beam irradiation apparatus, which is relatively widely used, production facilities are easily introduced and a production process can be easily controlled.

Herein the phrase "does not substantially contain an inorganic filler" means that an inorganic filler serving as a viscosity modifier is not contained, and a small amount of an inorganic material may be contained intentionally or inevitably to the extent that an effect of adjusting the viscosity is not exhibited. The term "main component" refers to a component having the highest content, and, for example, a component having a content of 50% by mass or more. The term "shear viscosity" refers to a value measured with a rotational rheometer.

Details of Embodiments of Present Invention

Embodiments of the present invention will now be described in detail with reference to the drawings.

[Multilayered Heat-Recoverable Article]

Figure 2:
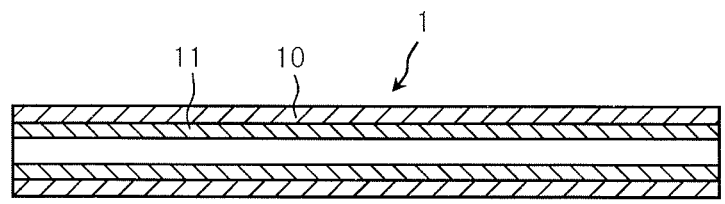
FIG. 2 is a schematic cross-sectional view taken along line X1-X1 in FIG. 1.
Figure 3:
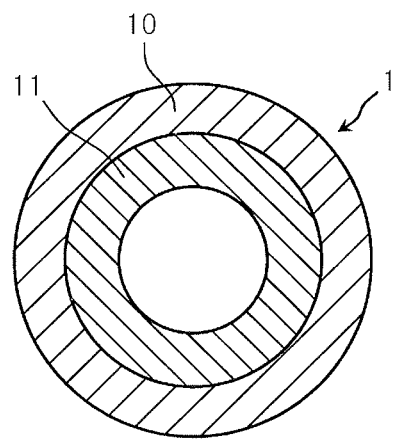
FIG. 3 is a schematic cross-sectional view taken along line X2-X2 in FIG. 1.

A multilayered heat-recoverable article 1 illustrated in FIGS. 1 to 3 is used as a covering for, for example, protection, insulation, waterproofness, and corrosion prevention of a connected portion of insulated electric wires, a wiring terminal, a metal tube, or the like. The multilayered heat-recoverable article 1 includes a cylindrical base material layer 10, and an adhesive layer 11 formed on an inner circumferential surface of the base material layer 10.

[Base Material Layer]

The base material layer 10 is formed as a tube whose diameter is reduced by heating. The base material layer 10 preferably contains a polyethylene, a polyester, a polyamide, or a fluororesin. These resins may be used alone or in combination of two or more resins. When the base material layer 10 contains the resins exemplified above, the base material layer 10 can have suitable heat shrinkability. Furthermore, since the resins exemplified above are available at a low cost, the production cost can be reduced.

A flame retardant is preferably added to the base material layer 10 for the purpose of improving flame retardancy. Furthermore, other additives may be added to the base material layer 10, as required. Examples of the additives include an oxidation inhibitor, a flame retardant, a copper inhibitor, a lubricant, a colorant, a heat stabilizer, and an ultraviolet absorber.

<Oxidation Inhibitor>

Examples of the oxidation inhibitor include phenol-based compounds, amine-based compounds, hindered amine-based compounds, hindered phenol-based compounds, salicylic acid derivatives, benzophenone-based compounds, and benzotriazole-based compounds. In particular, hindered amine-based compounds, which have a good effect of suppressing cross-linking, are preferably used. By using such an oxidation inhibitor, resistance to damage by copper can be further improved. As the oxidation inhibitor, besides the above compounds, sulfur-based compounds, phosphorous acid ester-based compounds, and the like may be used alone or in combination.

The lower limit of the content of the oxidation inhibitor in the base material layer 10 is preferably 1 part by mass, and more preferably 1.5 parts by mass relative to 100 parts by mass of the resin component. The upper limit of the content of the oxidation inhibitor is preferably 5 parts by mass, and more preferably 3 parts by mass relative to 100 parts by mass of the resin component. When the content of the oxidation inhibitor is less than the lower limit, the base material layer 10 is easily oxidized, and the multilayered heat-recoverable article 1 may degrade. When the content of the oxidation inhibitor exceeds the upper limit, blooming and bleeding may occur.

(Phenol-Based Compound)

Examples of the phenol-based compounds used as the oxidation inhibitor include pentaerythritol tetrakis[3-3,5-di-tert-butyl-4-hydroxyphenyl)propionate], tetrakis-[methylene-3-(3'5'-di-tert-butyl-4'-hydroxyphenyl)propionate]methane, triethylene glycol-bis[3-(3-tert-butyl-5-methyl-4-hydroxyphenyl)propionate], and 6-(4-hydroxy-3,5-di-tert-butyl.anilino)-2,4-bis.octyl-thio-1,3,5-triazine.

(Amine-Based Compound)

Examples of the amine-based compounds used as the oxidation inhibitor include 4,4'-(α,α-dimethylbenzyl)diphenylamine, polymerized products of 2,2,4-trimethyl-1,2-dihydroquinoline, 6-ethoxy-2,2,4-trimethyl-1,2-dihydroquinoline, N-(1,3-dimethylbutyl)-N'-phenyl-1,4-phenylenediamine, and N-isopropyl-N'-phenyl-1,4-phenylenediamine.

<Flame Retardant>

Examples of the flame retardant include chlorine-based flame retardants such as chlorinated paraffin, chlorinated polyethylene, chlorinated polyphenyl, and perchloropentacyclodecane; bromine-based flame retardants such as 1,2-bis(2, 3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, dibromoneopentyl glycol and ammonium bromide; phosphoric acid esters or phosphorus compounds such as triallyl phosphate, alkyl allyl phosphates, alkyl phosphates, dimethyl phosphonate, phosphorinate, halogenated phosphorinate esters, trimethyl phosphate, tributyl phosphate, trioctyl phosphate, tributoxyethyl phosphate, octyl diphenyl phosphate, tricresyl phosphate, cresyl phenyl phosphate, triphenyl phosphate, tris(chloroethyl) phosphate, tris(2-chloropropyl) phosphate, tris(2,3-dichloropropyl) phosphate, tris(2,3-dibromopropyl) phosphate, tris(bromochloropropyl) phosphate, bis(2,3-dibromopropyl) 2,3-dichloropropyl phosphate, bis(chloropropyl) monooctyl phosphate, polyphosphonate, polyphosphate, aromatic polyphosphate, and aluminum tris(diethylphosphinate); polyols such as phosphonate polyols, phosphate polyols, and halogen element-containing polyols; nitrogen compounds such as melamine cyanurate, triazine, isocyanurates, urea, and guanidine; and other compounds such as silicone-based polymers, ferrocene, fumaric acid, and maleic acid. Among these, halogen-based flame retardants such as bromine-based flame retardants and chlorine-based flame retardants are preferable. The bromine-based flame retardants and the chlorine-based flame retardants may be used alone or in combination of two or more compounds.

Regarding the range of the content of the flame retardant, for example, in the case of a bromine-based flame retardant, the lower limit is preferably 1 part by mass, and more preferably 5 parts by mass relative to 100 parts by mass of the resin component. The upper limit is preferably 50 parts by mass, and more preferably 40 parts by mass relative to 100 parts by mass of the resin component. When the content of the flame retardant is less than the lower limit, the effect of imparting flame retardancy may not be obtained. When the content of the flame retardant exceeds the upper limit, toughness and elongation necessary for the heat-recoverable article may degrade.

<Copper Inhibitor>

Examples of the copper inhibitor include 3-(N-salicyloyl) amino-1,2,4-triazole, decamethylenedicarboxylic acid disalicyloylhydrazide, and 2,3-bis[3-(3,5-di-tert-butyl-4-hydroxyphenyl)propionyl]propionohydrazide. Damage by copper can be prevented by incorporating the copper inhibitor in the base material layer 10. In the case where an oxidation inhibitor is contained in the base material layer 10 and the adhesive layer 11, the copper inhibitor is not necessarily contained in the base material layer 10. Thus, by not incorporating an expensive copper inhibitor, the production cost of the multilayered heat-recoverable article 1 can be reduced.

Regarding the range of the content of the copper inhibitor, for example, in the case where the copper inhibitor is 3-(N-salicyloyl)amino-1,2,4-triazole, the lower limit is preferably 0.5 parts by mass, and more preferably 1 part by mass relative to 100 parts by mass of the resin component. The upper limit is preferably 10 parts by mass, and more preferably 5 parts by mass relative to 100 parts by mass of the resin component. When the content of the copper inhibitor is less than the lower limit, the effect of the copper inhibitor may not be obtained. Even when the content of the copper inhibitor exceeds the upper limit, an improvement in the effect of preventing damage by copper is not obtained.

[Adhesive Layer]

The adhesive layer 11 is a layer for enhancing adhesiveness between a portion to be adhered and the base material layer 10 and improving a waterproofing property, etc. The adhesive layer 11 is formed of a resin composition that contains a polyimide as a main component and that does not substantially contain an inorganic filler. The adhesive layer 11 is cross-linked by irradiation with ionizing radiation. The resin composition that forms the adhesive layer 11 preferably contains an oxidation inhibitor. The resin composition that forms the adhesive layer 11 may contain a very low-density polyethylene or an ethylene copolymer. Furthermore, other additives may be added to the resin composition that forms the adhesive layer 11, as required. Examples of the additives include an oxidation inhibitor, a copper inhibitor, a viscosity improver, a deterioration inhibitor, a flame retardant, a lubricant, a colorant, a heat stabilizer, an ultraviolet absorber, and a tackifier.

The lower limit of a shear viscosity of the adhesive layer 11 at 150° C. at a shear rate of $0.01$ $s^{-1}$ is preferably 300 Pa·s, and more preferably 400 Pa·s. The upper limit of the shear viscosity at a shear rate of $0.01$ $s^{-1}$ is preferably 3,000 Pa·s, and more preferably 1,000 Pa·s. When the shear viscosity at a shear rate of $0.01$ $s^{-1}$ is less than the lower limit, the adhesive layer 11 may flow out from the base material layer 10, or it may become difficult to stably extrude the adhesive layer 11. When the shear viscosity at a shear rate of $0.01$ $s^{-1}$ exceeds the upper limit, extrusion moldability may be insufficient.

The lower limit of a shear viscosity of the adhesive layer 11 at 150° C. at a shear rate of 100 $s^{-1}$ is preferably 10 Pa·s, and more preferably 20 Pa·s. The upper limit of the shear viscosity of the adhesive layer 11 at 150° C. at a shear rate of 100 $s^{-1}$ is preferably 200 Pa·s, and more preferably 100 Pa·s. When the shear viscosity at a shear rate of 100 $s^{-1}$ is less than the lower limit, during heat shrinkage of the base material layer 10, the adhesive layer 11 may excessively flow and may flow out from the base material layer 10. When the shear viscosity at a shear rate of 100 exceeds the upper limit, during heat shrinkage of the base material layer 10, the adhesive layer 11 cannot deform sufficiently and the adhesion of the multilayered heat-recoverable article 1 to an adherend may be insufficient.

<Polyamide>

In the resin composition that forms the adhesive layer 11, at least a polyamide which is a main component is cross-linked by irradiation with ionizing radiation. The cross-linked polyamide forms a network and imparts the adhesive layer 11 with thixotropy in which the shear viscosity decreases when the shear rate is high, as described above.

In the case where a trimer acid content is increased in the synthesis of a polyamide, the proportion of the synthesized polyamide having a branched structure increases. A polyamide having a high proportion of a branched structure is easily slightly cross-linked. Accordingly, such a polyamide is easily cross-linked by irradiation with ionizing radiation, and an improvement in thixotropy of the adhesive layer increases. In the case where a resin composition containing only a polyamide is used, the trimer acid content of the polyamide is preferably 20% by mass or more, more preferably 25% by mass or more, and still more preferably 30% by mass or more. When the trimer acid content of the polyamide is less than 20% by mass, the polyamide is preferably used in combination with another resin such as a very low-density polyethylene or an ethylene copolymer.

The lower limit of a melt flow rate (MFR) of a raw material polyamide before being irradiated with ionizing radiation is preferably 15 g/10 min, more preferably 50 g/10 min, and still more preferably 100 g/10 min. The upper limit of the MFR of the raw material polyamide is preferably 1,000 g/10 min, more preferably 500 g/10 min, and still more preferably 300 g/10 min.

When the MFR of the raw material polyamide is less than the lower limit, flowability is excessively high even after cross-linking. Accordingly, the adhesive layer 11 may flow out from the base material layer 10, or it may become difficult to stably extrude the adhesive layer 11. In the case where the MFR of the raw material polyamide exceeds the upper limit, flowability of the adhesive layer 11 during heat shrinkage of the base material layer 10 is insufficient when the multilayered heat-recoverable article 1 is used. Consequently, adhesion of the multilayered heat-recoverable article 1 to an adherend may be insufficient. Herein, the MFR is an index that represents flowability of a resin. The term "MFR" refers to a value measured using an extrusion plastometer specified in JIS-K6760 (1997). Regarding polyamides, the MFR is a value measured at a temperature of 120° C. and at a load of 2.16 kg. Regarding other resins, the MFR is a value measured at a temperature of 190° C. and at a load of 2.16 kg.

<Very Low-Density Polyethylene>

The resin composition that forms the adhesive layer 11 may contain a very low-density polyethylene (VLDPE) as a resin component for the purpose of improving thixotropy obtained by the cross-linking. The very low-density polyethylene is a polyethylene having a specific gravity of 0.91 g/cm$^3$ or less.

The lower limit of the content of the very low-density polyethylene in the resin composition that forms the adhesive layer 11 is preferably 20% by mass, and more preferably 25% by mass. The upper limit of the content of the very low-density polyethylene is preferably 49% by mass, and more preferably 45% by mass.

When the content of the very low-density polyethylene is less than the lower limit, the effect of improving thixotropy of the adhesive layer 11 may be insufficient. When the content of the very low-density polyethylene exceeds the upper limit, the adhesive layer 11 has an excessively high viscosity, and adhesion of the multilayered heat-recoverable article 1 to an adherend may be insufficient.

The lower limit of the MFR of the very low-density polyethylene is preferably 0.1 g/10 min, and more preferably 1 g/10 min. The upper limit of the MFR of the very low-density polyethylene is preferably 800 g/10 min, and more preferably 400 g/10 g. When the MFR of the very low-density polyethylene is less than the lower limit, flowability of the resin composition during heating may be insufficient. When the MFR of the very low-density polyethylene exceeds the upper limit, the viscosity of the resin composition tends to be low, and a large absorbed dose of ionizing radiation may be necessary, which may be uneconomical.

The lower limit of the specific gravity of the very low-density polyethylene is preferably 0.85 g/cm$^3$, and more preferably 0.87 g/cm$^3$. The upper limit of the specific gravity of the very low-density polyethylene is preferably 0.91 g/cm$^3$, more preferably 0.90 g/cm$^3$, and still more preferably 0.89 g/cm$^3$. A very low-density polyethylene having a low specific gravity has a small amount of crystal and is easily cross-linked, and thus easily forms a long-chain branched structure. Accordingly, an improvement in thixotropy of the adhesive layer increases. When the specific gravity of the very low-density polyethylene is less than the lower limit, the viscosity of the resin composition tends to be low, and a large absorbed dose of ionizing radiation may be necessary, which may be uneconomical. When the specific gravity of the very low-density polyethylene exceeds the upper limit, flowability of the resin composition during heating may be insufficient.

In the case where the resin composition that forms the adhesive layer 11 contains a very low-density polyethylene, the resin composition may contain, as an additive, an alloying agent for enhancing compatibility between the polyamide and the very low-density polyethylene. Examples of the alloying agent include maleic anhydride and acrylic acid-modified polyethylene. The content of the alloying agent in the resin composition that forms the adhesive layer 11 may be 0.5% by mass or more and 5% by mass or less.

<Ethylene Copolymer>

The resin composition that forms the adhesive layer 11 may contain an ethylene copolymer as a resin component for the purpose of improving thixotropy obtained by the cross-linking. Specific examples of the ethylene copolymer include ethylene-vinyl acetate copolymers (EVA), ethylene-butene copolymers, ethylene-octene copolymers, ethylene-ethyl acrylate copolymers, and ethylene-butyl acrylate copolymers (EBA). The ethylene copolymer is particularly preferably an ethylene-vinyl acetate copolymer.

The lower limit of the content of the ethylene copolymer in the resin composition that forms the adhesive layer 11 is preferably 20% by mass, and more preferably 25% by mass. The upper limit of the content of the ethylene copolymer is 49% by mass, and more preferably 45% by mass. When the content of the ethylene copolymer is less than the lower limit, the effect of improving thixotropy of the adhesive layer 11 may be insufficient. When the content of the ethylene copolymer exceeds the upper limit, the adhesive layer 11 has an excessively high viscosity, and adhesion of the multilayered heat-recoverable article 1 to an adherend may be insufficient.

<Ethylene-Vinyl Acetate Copolymer>

The lower limit of the MFR of an ethylene-vinyl acetate copolymer, which is particularly preferable among the ethylene copolymers mentioned above, is preferably 1 g/10 min, and more preferably 5 g/10 min. The upper limit of the MFR of the ethylene vinyl acetate copolymer is preferably 2,000 g/10 min, more preferably 1,000 g/10 min, and still more preferably 500 g/10 min. When the MFR of the ethylene-vinyl acetate copolymer is less than the lower limit, flowability of the resin composition during heating may be insufficient. When the MFR of the ethylene-vinyl acetate copolymer exceeds the upper limit, the viscosity of the resin composition tends to be low, and a large absorbed dose of ionizing radiation may be necessary, which may be uneconomical.

<Oxidation Inhibitor>

The same oxidation inhibitor as that in the base material layer 10 may be used as the oxidation inhibitor in the adhesive layer 11.

The oxidation inhibitor also has a function of suppressing cross-linking of the resin composition caused by irradiation with ionizing radiation. The lower limit of the content of the oxidation inhibitor in the adhesive layer 11 is preferably 1 part by mass, and more preferably 2 parts by mass relative to 100 parts by mass of the resin component in the resin composition. The upper limit of the content of the oxidation inhibitor is preferably 20 parts by mass, and more preferably 15 parts by mass relative to 100 parts by mass of the resin component in the resin composition. When the content of the oxidation inhibitor is less than the lower limit, the adhesive layer 11 and the base material layer 10 are easily oxidized, and the multilayered heat-recoverable article 1 may degrade. In addition, it may become difficult to uniformly cross-link the material to a deep position as a result of irradiation with ionizing radiation.

Even when the content of the oxidation inhibitor exceeds the upper limit, an improvement in the effect of preventing the adhesive layer 11 and the base material layer 10 from being oxidized is not obtained, and imparting of thixotropy due to cross-linking may be inhibited.

<Copper Inhibitor>

Examples of the copper inhibitor include compounds the same as those used as the copper inhibitor in the base material layer 10. In the case where an oxidation inhibitor is contained in the base material layer 10 and the adhesive layer 11, the copper inhibitor is not necessarily contained in the adhesive layer 11.

<Deterioration Inhibitor>

The deterioration inhibitor is an agent for suppressing deterioration of an adherend to which the multilayered heat-recoverable article 1 adheres. Typically, the deterioration inhibitor is an agent for suppressing generation of cracks of an insulating layer of an insulated electric wire due to a basic component contained in the insulating layer or the adhesive layer 11 of the multilayered heat-recoverable article 1. This deterioration inhibitor can also function as a viscosity improver. The deterioration inhibitor is selected in accordance with the factor of deterioration of an adherend. For example, in the case where deterioration of an adherend due to a basic component is suppressed, it is possible to use a compound that suppresses the occurrence of a dehydrochlorination reaction due to a basic component or a compound that can capture or neutralize hydrogen chloride, a chloride ion, and the like generated by a dehydrochlorination reaction. Examples of the deterioration inhibitor include activated clay, hydrotalcite, and oxidation inhibitors (acid value: 10 mgKOH/g or more) containing phosphorus. By incorporating any of these deterioration inhibitors in the adhesive layer 11, deterioration of an adherend due to a basic component in the adhesive layer 11 can be suppressed by, for example, adsorbing a nitrogen-containing compound, incorporating an anion, and capturing hydrogen chloride generated by a dehydrochlorination reaction.

<Method for Producing Multilayered Heat-Recoverable Article>

The multilayered heat-recoverable article 1 can be produced by, for example, the steps described below.

(1) A step of preparing a base material layer resin composition for forming a base material layer 10
(2) A step of producing an adhesive resin composition for forming an adhesive layer 11
(3) A step of forming a multilayered extrusion-molded product by extruding the base material layer resin composition and the adhesive resin composition using a melt-extruder
(4) A step of expanding a diameter of the multilayered extrusion-molded product to obtain a multilayered heat-recoverable article 1

(1) Base Material Layer Resin Composition Preparation Step

A base material layer resin composition can be prepared by mixing a resin component, and, as required, an additive using, for example, a melt-mixer. A known melt-mixer, for example, an open roll mill, a Banbury mixer, a pressure kneader, a single-screw mixer, or a multi-screw mixer may be used.

(2) Adhesive Production Step

An adhesive production step includes a step of preparing an adhesive resin composition and a step of irradiating the adhesive resin composition with ionizing radiation.

(Adhesive Resin Composition Preparation Step)

An adhesive resin composition contains a polyamide as a main component. The adhesive resin composition may contain, as a resin component, a very low-density polyethylene or an ethylene copolymer in addition to the polyamide. The adhesive resin composition can be prepared by mixing the resin component, an oxidation inhibitor, and, as required, an additive using, for example, a melt-mixer. The same melt-mixer as that used in the preparation of the base material layer resin composition can be used as the melt-mixer.

(Ionizing Radiation Irradiation Step)

Examples of ionizing radiation applied to the adhesive resin composition include electron beams and gamma rays. Electron beams, for which irradiation equipment is relatively easily prepared, are preferable.

In this ionizing radiation irradiation step, a dose of the ionizing radiation is controlled so that a shear viscosity of the resulting adhesive at 150° C. is 300 Pa·s or more at a shear rate of $0.01\ s^{-1}$ and 200 Pa·s or less at a shear rate of $100\ s^{-1}$.

In order to specifically achieve the above shear viscosity, the lower limit of the dose of the ionizing radiation absorbed by the adhesive resin composition is preferably 90 kJ/kg, and more preferably 200 kJ/kg. The upper limit of the dose of the ionizing radiation absorbed by the adhesive resin composition is preferably 1,000 kJ/kg, and more preferably 500 kJ/kg. When the dose of the ionizing radiation absorbed by the adhesive resin composition is less than the lower limit, sufficient thixotropy may not be imparted to the adhesive resin composition. When the dose of the ionizing radiation absorbed by the adhesive resin composition exceeds the upper limit, the cost may be unnecessarily increased, or the viscosity may be excessively increased by excessive cross-linking of the resin composition, which may result in the difficulty in injection molding.

The ionizing radiation irradiation step may be performed, prior to the adhesive resin composition preparation step, on a resin composition prepared by mixing an oxidation inhibitor with a resin component that contains at least a polyamide and that may contain a very low-density polyethylene or an ethylene copolymer, the resin component being contained in the adhesive resin composition. That is, a resin other than the above resin component and an additive other than the oxidation inhibitor may be added after the irradiation with ionizing radiation.

(3) Multilayered Extrusion-Molded Product Formation Step

A multilayered extrusion-molded product is formed by simultaneously extruding the base material layer resin composition and the adhesive resin composition using a known melt-extruder. As a result, the multilayered extrusion-molded product is formed as a molded product in which an inner layer corresponding to the adhesive layer 11 is formed on an inner circumferential surface of an outer layer corresponding to the base material layer 10. Heat resistance of the multilayered extrusion-molded product may be improved by cross-linking the material constituting the base material layer resin composition. Examples of the cross-linking method include cross-linking by irradiation with ionizing radiation, chemical cross-linking, and thermal cross-linking.

The dimensions of the multilayered extrusion-molded product can be designed in accordance with the use etc. Regarding the dimensions of the base material layer 10 of the multilayered extrusion-molded product, for example, the inner diameter and the wall thickness are 1.0 to 30 mm and 0.1 to 10 mm, respectively. Regarding the dimensions of the adhesive layer 11 of the multilayered extrusion-molded product, for example, the inner diameter and the wall thickness are 0.1 to 10 mm and 0.1 mm to 8.5 mm, respectively.

(4) Diameter Expansion Step of Multilayered Extrusion-Molded Product

Expansion of the diameter of the multilayered extrusion-molded product is performed as follows. The multilayered extrusion-molded product is inflated so as to have a predetermined inner diameter by, for example, introducing compressed air to the inside thereof in a state where the multilayered extrusion-molded product is heated at a temperature equal to or higher than a melting point thereof. Subsequently, the resulting multilayered extrusion-molded product is cooled to fix the shape. Such an expansion of the diameter of the multilayered extrusion-molded product is performed such that, for example, the inner diameter of the multilayered extrusion-molded product is increased by about 2 to 4 times. The resulting product obtained by expanding the diameter of the multilayered extrusion-molded product and fixing the shape as described above is the multilayered heat-recoverable article 1.

[Advantages]

According to the multilayered heat-recoverable article 1, since the adhesive layer 11 contains a polyamide cross-liked by irradiation with ionizing radiation, the adhesive layer 11 does not flow before and after heat shrinkage of the base material layer 10, and exhibits sufficient flowability during heat shrinkage of the base material layer 10 and can closely adhere to an adherend.

[Wire Splice and Wire Harness]

The multilayered heat-recoverable article 1 can be used for, for example, protection, insulation, waterproofness, and corrosion prevention of wires such as a polyethylene (PE) electric wire or PE cable that includes an insulating layer composed of PE, the insulating layer covering a conductor, and a polyvinyl chloride (PVC) electric wire or PVC cable that includes an insulating layer composed of PVC. Specifically, the multilayered heat-recoverable article 1 can be applied to a wire splice and a wire harness.

Figure 4:
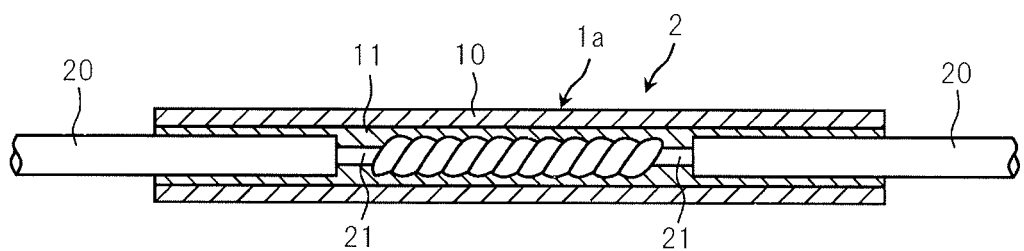
FIG. 4 is a schematic cross-sectional view illustrating a wire splice according to an embodiment of the present invention, the cross-sectional view corresponding to FIG. 2.
Figure 5:
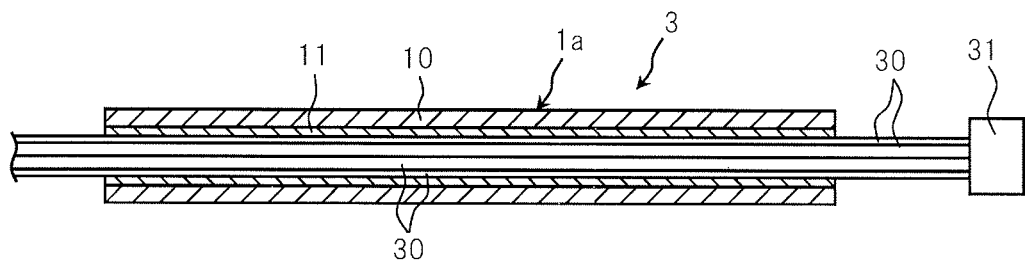
FIG. 5 is a schematic cross-sectional view illustrating a wire harness according to an embodiment of the present invention, the cross-sectional view corresponding to FIG. 2.
Figure 6:
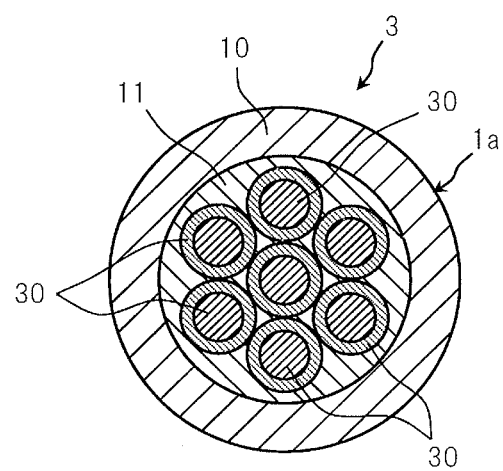
FIG. 6 is a schematic cross-sectional view of the wire harness illustrated in FIG. 5, the cross-sectional view corresponding to FIG. 3.

FIG. 4 illustrates an example in which the multilayered heat-recoverable article 1 is applied to a wire splice. FIGS. 5 and 6 illustrate an example in which the multilayered heat-recoverable article 1 is applied to a wire harness.

The wire splice 2 illustrated in FIG. 4 is obtained by stranding conductor wires 21 of a pair of wires 20 to connect to each other, and allowing a tube 1a to adhere to the connected portion, the tube 1a being formed by thermally shrinking the multilayered heat-recoverable article 1 in FIG. 1.

Each of the wires 20 is a cable or an insulated electric wire such as a PE electric wire or a PVC electric wire. For example, a wire that includes an insulating layer serving as an outermost layer and containing polyvinyl chloride as a main component is used as the wire 20. The content of polyvinyl chloride in the insulating layer is, for example, 50% by mass or more and 95% by mass or less. In this wire splice, the tube 1a can contribute to, for example, protection, insulation, waterproofness, and corrosion prevention of the connected portion.

The wire harness 3 illustrated in FIGS. 5 and 6 is obtained by bundling a plurality of wires 30 with a tube 1a formed by thermally shrinking the multilayered heat-recoverable article 1 in FIG. 1, and providing a multi-pin connector 31 at an end of the wires 30. The wires 30 are the same as the wires 20 of the wire splice illustrated in FIG. 4. In this wire harness, the tube 1a has not only a function of bundling the wires 30 but also a function of protecting each of the wires 30, etc.

It should be noted that the wire splice and the wire harness of the present invention may not be exactly discriminated from each other. There may be a case where a wire splice also functions as a wire harness.

Other Embodiments

It is to be understood that the embodiments disclosed herein are only illustrative and are not restrictive in all respects. The scope of the present invention is not limited to the configurations of the above embodiments but is defined by the claims described below. It is intended that the scope of the present invention includes equivalents of the claims and all modifications within the scope of the claims.

Figure 7:
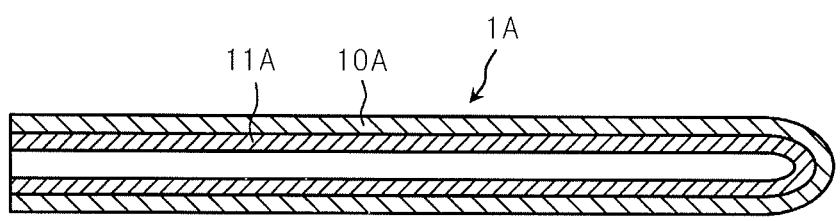
FIG. 7 is a schematic cross-sectional view illustrating a multilayered heat-recoverable article according to another embodiment of the present invention, the cross-sectional view corresponding to FIG. 2.

The multilayered heat-recoverable article of the present invention is not limited to the multilayered heat-recoverable article 1 illustrated in FIGS. 1 to 3, the multilayered heat-recoverable article 1 including a base material layer 10 formed so as to have a tubular shape. Alternatively, for example, the multilayered heat-recoverable article may be a multilayered heat-recoverable article 1A including a base material layer 10A formed so as to have a cap shape, as illustrated in FIG. 7. This multilayered heat-recoverable article 1A is obtained by thermally shrinking an end of the multilayered heat-recoverable article 1 to close the end. As a result, an adhesive layer 11A is disposed on an inner circumferential surface of the cap-shaped base material layer 10A. This multilayered heat-recoverable article 1A can be suitably used for, for example, a terminal treatment of wiring.

The multilayered heat-recoverable article of the present invention may be formed by separately extruding a base material layer and an adhesive layer. The multilayered heat-recoverable article in this case is used by arranging an adhesive layer on an inner circumferential surface of a base material layer that has been inflated after extrusion molding, covering an adherend with the base material layer having the adhesive layer on an inner circumferential surface thereof, and shrinking the base material layer.

The wire splice of the present invention is not particularly limited as long as a multilayered heat-recoverable article adheres to a connected portion of wires. In the wire splice, a single wire may be connected to a plurality of wires, a plurality of wires may be connected to a plurality of wires, or ends of a plurality of wires may be integrally connected to each other, as in a terminal treatment of wiring. Alternatively, the wire splice of the present invention may have other forms.

The wire harness of the present invention may be constituted as a so-called flat harness in which a plurality of wires are bundled in a planar shape. Alternatively, the wire harness of the present invention may have other forms.

EXAMPLES

The present invention will now be described in more detail on the basis of Examples. However, the Examples do not limit the scope of the present invention.

Adhesive resin composition Nos. 1 to 11 were experimentally prepared so as to have the compositions shown in Table I using, as resin raw materials, a polyamide (1), very low-density polyethylenes, and ethylene-vinyl acetate copolymers. In Table I, the symbol "-" means that the component is not mixed.

TABLE I

| Component | Adhesive resin composition | | | | | | | | | | |
|---|---|---|---|---|---|---|---|---|---|---|---|
| (parts by mass) | No. | No. 2 | No. 3 | No. 4 | No. 5 | No. 6 | No. 7 | No. 8 | No. 9 | No. 10 | No. 11 |
| Polyamide (1) | 70 | 55 | 70 | 70 | 70 | 100 | 85 | 40 | 70 | 85 | — |
| VLDPE (A) | 30 | 45 | — | — | — | — | 15 | 60 | — | — | — |
| VLDPE (B) | — | — | 30 | — | — | — | — | — | — | — | — |
| EVA (A) | — | — | — | — | — | — | — | — | 30 | — | — |
| EVA (B) | — | — | — | 30 | — | — | — | — | — | 15 | — |
| EVA (C) | — | — | — | — | 30 | — | — | — | — | — | 100 |
| Inorganic filler | — | — | — | — | — | — | — | — | — | — | 10 |

A polyamide containing a trimer acid in an amount of 14% by mass and having an MFR of 120 g/10 min and a softening point of 105° C. was used as the raw material polyamide (1). A very low-density polyethylene (VLDPE) (A) having an MFR of 30 g/10 min, a melting point of 96° C., and a specific gravity of 0.90 g/cm$^3$, and a VLDPE (B) having an MFR of 3 g/10 min, a melting point of 97° C., and a specific gravity of 0.90 g/cm$^3$ were used as the very low-density polyethylenes. An ethylene-vinyl acetate copolymer (EVA) (A) having an MFR of 800 g/10 min, a melting point of 73° C., a specific gravity of 0.95 g/cm$^3$, and a vinyl acetate content of 28% by mass, an EVA (B) having an MFR of 400 g/10 min, a melting point of 62° C., a specific gravity of 0.95 g/cm³, and a vinyl acetate content of 28% by mass, and an EVA (C) having an MFR of 150 g/10 min, a melting point of 65° C., a specific gravity of 0.95 g/cm³, and a vinyl acetate content of 28% by mass were used as the ethylene-vinyl acetate copolymers.

In each of the adhesive resin composition Nos. 1 to 11, 10 parts by mass of an oxidation inhibitor was added relative to 100 parts by mass of the resin component. Furthermore, in the adhesive of No. 11, 10 parts by mass of hydrophilic fumed silica ("AEROSIL 200" manufactured by Nippon Aerosil Co., Ltd.) having a specific surface area of 200 m²/g was added as an inorganic filler for adjusting the viscosity relative to 100 parts by mass of the resin component.

The resin component and the additives were sufficiently mixed to prepare the adhesive resin compositions. Each of the adhesive resin compositions was irradiated with an electron beam so that the absorbed dose was different. Thus, a plurality of adhesives were obtained from each of the adhesive resin compositions. The absorbed dose of the electron beam was adjusted to 100 kJ/kg, 200 kJ/kg, 300 kJ/kg, 400 kJ/kg, and 500 kJ/kg.

For each of the adhesives that were prepared by irradiating the adhesive resin composition Nos. 1 to 11 with an electron beam and that had different absorbed doses, a shear viscosity was measured in order to examine the ease of flowing of the adhesive from a base material layer after heat shrinkage when the adhesive was used as an adhesive for a multilayered heat-recoverable article.

(Measurement of Shear Viscosity)

The shear viscosity was measured at a temperature of 150° C. using a rotational rheometer ("MCR302" manufactured by Anton Paar) with a PP-12 jig. The shear viscosity was measured while the shear rate was changed from $0.001$ $s^{-1}$ to $1,000$ $s^{-1}$. The shear rate is determined by the shape of a rotator and the rotational speed. The rotational rheometer is configured to automatically determine the shear rate.

Table II shows a shear viscosity of each of the adhesives at a shear rate of $0.01$ $s^{-1}$. Table III shows a shear viscosity of each of the adhesives at a shear rate of $100$ $s^{-1}$. In Tables below, the symbol "-" means that the measurement could not be performed or a measurement value or an evaluation value was not obtained for some other reasons.

As shown above, regarding the adhesive resin composition No. 1, when the absorbed dose of the electron beam was 300 kJ/kg or more and 500 kJ/kg or less, the shear viscosity at a shear rate of $0.01$ $s^{-1}$ was 300 Pa·s or more, and the shear viscosity at a shear rate of $100$ $s^{-1}$ was 200 Pa·s or less. Thus, the adhesive resin composition had thixotropy suitable for an adhesive for a multilayered heat-recoverable article.

Similarly, regarding the adhesive resin composition No. 2, when the absorbed dose of the electron beam was 200 kJ/kg or more and 300 kJ/kg or less; regarding the adhesive resin composition No. 3, when the absorbed dose of the electron beam was 100 kJ/kg or more and 400 kJ/kg or less; regarding the adhesive resin composition No. 4, when the absorbed dose of the electron beam was 500 kJ/kg; regarding the adhesive resin composition No. 5, when the absorbed dose of the electron beam was 400 kJ/kg or more and 500 kJ/kg or less; regarding the adhesive resin composition No. 7, when the absorbed dose of the electron beam was 400 kJ/kg or more and 500 kJ/kg or less; and regarding the adhesive resin composition No. 11, when the absorbed dose of the electron beam was 300 kJ/kg, the adhesive resin composition had thixotropy suitable for an adhesive for a multilayered heat-recoverable article.

In contrast, the adhesive resin composition No. 6 and Nos. 8 to 10 did not have thixotropy suitable for adhesives for multilayered heat-recoverable articles within this range of the absorbed dose of the electron beam.

Figure 9:
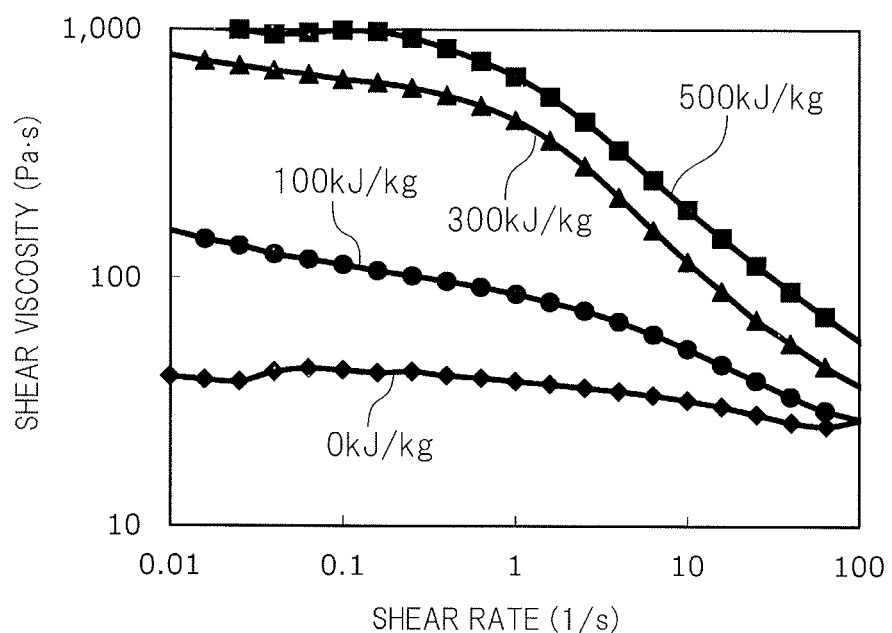
FIG. 9 is a graph showing the measurement results of the viscosity of an adhesive for a multilayered heat-recoverable article in an Example of the present invention for each absorbed dose of an electron beam.
Figure 10:
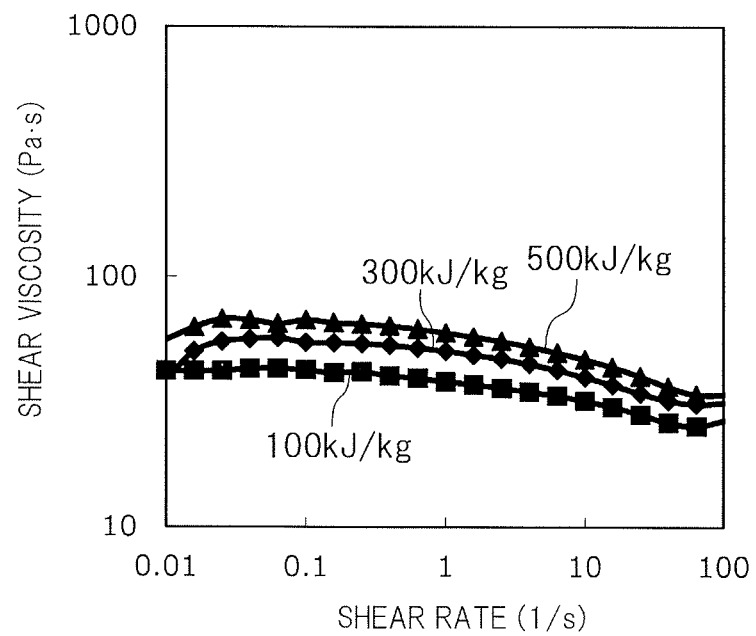
FIG. 10 is a graph showing the measurement results of the viscosity of an adhesive for a multilayered heat-recoverable article in an Example of the present invention, the Example being different from the Example in FIG. 9, for each absorbed dose of an electron beam.

Furthermore, among these, regarding a plurality of adhesives formed by irradiating the adhesive resin composition Nos. 1 and 6 with an electron beam such that the absorbed dose was different, the shear viscosity was measured under the conditions similar to those in Tables II and III. FIGS. 9 and 10 each show the detailed relationship between the shear rate and the shear viscosity obtained by this measurement.

As shown in the figure, regarding the adhesive resin composition No. 1, before the electron beam irradiation, a change in the shear viscosity with the change in the shear rate is small. However, the adhesive resin composition is modified by the electron beam irradiation, and the shear viscosity in a low shear rate region is sufficiently higher than the shear viscosity in a high shear rate region. Thus, the adhesive resin compo-

TABLE II

| Shear viscosity (Pa · s) | | Adhesive resin composition | | | | | | | | | | |
|---|---|---|---|---|---|---|---|---|---|---|---|---|
| (Shear rate: $0.01$ $s^{-1}$) | | No. 1 | No. 2 | No. 3 | No. 4 | No. 5 | No. 6 | No. 7 | No. 8 | No. 9 | No. 10 | No. 11 |
| Absorbed dose | 100 (kJ/kg) | 140 | 270 | 320 | 80 | 120 | 40 | 80 | 980 | 60 | 40 | — |
| | 200 (kJ/kg) | 150 | 790 | 1870 | 90 | 130 | 30 | 110 | 6530 | 60 | 50 | — |
| | 300 (kJ/kg) | 760 | 5180 | 1350 | 120 | 180 | 40 | 240 | 9830 | 90 | 70 | 580 |
| | 400 (kJ/kg) | 740 | 8150 | 3520 | 150 | 550 | 50 | 480 | — | 80 | 70 | — |
| | 500 (kJ/kg) | 1050 | 9220 | 5380 | 380 | 450 | 70 | 510 | — | 100 | 100 | — |

TABLE III

| Shear viscosity (Pa · s) | | Adhesive resin composition | | | | | | | | | | |
|---|---|---|---|---|---|---|---|---|---|---|---|---|
| (Shear rate: $100$ $s^{-1}$) | | No. 1 | No. 2 | No. 3 | No. 4 | No. 5 | No. 6 | No. 7 | No. 8 | No. 9 | No. 10 | No. 11 |
| Absorbed dose | 100 (kJ/kg) | 30 | 80 | 70 | 40 | 40 | 20 | 50 | 350 | 30 | 30 | — |
| | 200 (kJ/kg) | 40 | 90 | 90 | 50 | 40 | 30 | 50 | 3800 | 40 | 40 | — |
| | 300 (kJ/kg) | 40 | 140 | 90 | 50 | 50 | 20 | 70 | 7540 | 40 | 40 | 180 |
| | 400 (kJ/kg) | 60 | 210 | 140 | 60 | 80 | 30 | 70 | — | 50 | 50 | — |
| | 500 (kJ/kg) | 60 | 300 | 220 | 70 | 70 | 30 | 80 | — | 40 | 50 | — | sition No. 1 can be used as an adhesive which has suitable thixotropy and which does not easily flow out from a base material layer after heat shrinkage of a multilayered heat-recoverable article.

In contrast, regarding the adhesive resin composition No. 6, in the case of a shear rate of 100 s$^{-1}$, preferable results were obtained when the absorbed dose of the electron beam was 500 kJ/kg or less. However, in the case of a shear rate of 0.01 s$^{-1}$, the shear viscosity was 300 Pa·s or less. Thus, the adhesive resin composition No. 6 could not be used as an adhesive having suitable thixotropy.

Figure 11:
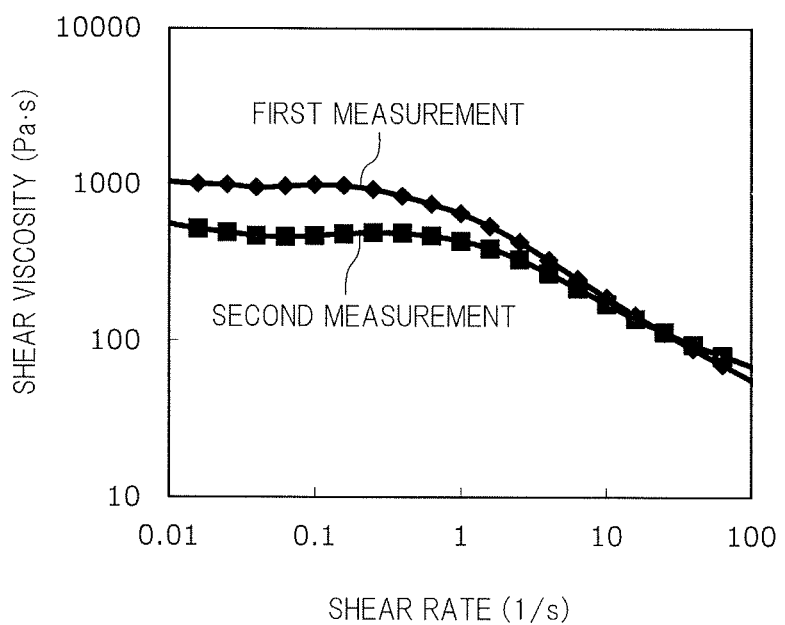
FIG. 11 is a graph showing the results of a continuous viscosity measurement of the adhesive for a multilayered heat-recoverable article shown in FIG. 9, the adhesive being irradiated with an electron beam at an absorbed dose of 500 kJ/kg.

Furthermore, regarding an adhesive prepared by irradiating the adhesive resin composition No. 1 with an electron beam such that the absorbed dose became 500 kJ/kg, immediately after the shear viscosity was measured once by the same method for measuring a shear viscosity as that shown in Tables II and III, the shear viscosity was again measured in order to verify the recovery force of the shear viscosity. FIG. 11 shows the measurement results. As shown in the figure, the first measurement results of the shear viscosity of this adhesive are not significantly different from the second measurement results of the shear viscosity of this adhesive. Accordingly, it is evaluated that, even after this adhesive is subjected to a shear once, the shear viscosity recovers immediately after the shear stress is removed.

Next, for each of the adhesives that were prepared by irradiating the adhesive resin composition Nos. 1 to 11 with an electron beam and that had different absorbed doses, a dripping property test described below was conducted.

(Dripping Property Test)

Figure 8:
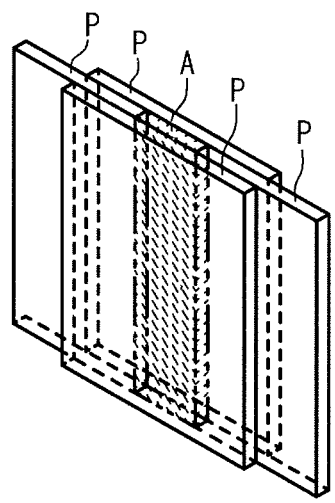
FIG. 8 is a schematic perspective view illustrating a device for measuring a dripping ratio.

The dripping property test is conducted as follows. First, a sheet-like adhesive having a thickness of 1 mm is cut to have dimensions of 5 mm×40 mm, and the mass of the sheet-like adhesive is measured. The resulting sheet-like adhesive A obtained by cutting is supported from four directions using four glass plates P, as illustrated in FIG. 8. Next, this sample is held in a thermostatic chamber at 150° C. in midair in the vertical direction and is left to stand for 24 hours. Subsequently, whether or not the adhesive A drips from the glass plates is examined. After further 72 hours, that is, after the sample is left to stand for total 96 hours, the mass of the adhesive A that has dripped from the glass plates is measured, and a dripping ratio (a ratio of the mass of the dripped adhesive to the mass of the original sheet-like adhesive) is calculated.

Table IV shows the dripping ratio of each of the adhesives.

TABLE IV

| Dripping ratio | | Adhesive resin composition | | | | | | | | | | |
|---|---|---|---|---|---|---|---|---|---|---|---|---|
| (mass %) | | No. 1 | No. 2 | No. 3 | No. 4 | No. 5 | No. 6 | No. 7 | No. 8 | No. 9 | No. 10 | No. 11 |
| Absorbed dose | 100 (kJ/kg) | 80 | 0 | 0 | 70 | 70 | 70 | 80 | 0 | 70 | 80 | — |
| | 200 (kJ/kg) | 70 | 0 | 0 | 80 | 70 | 70 | 80 | 0 | 80 | 70 | — |
| | 300 (kJ/kg) | 0 | 0 | 0 | 70 | 80 | 70 | 70 | 0 | 70 | 70 | 60 |
| | 400 (kJ/kg) | 0 | 0 | 0 | 50 | 0 | 70 | 70 | — | 70 | 70 | — |
| | 500 (kJ/kg) | 0 | 0 | 0 | 0 | 0 | 60 | 60 | — | 70 | 50 | — |

Table V shows the results of a dripping property evaluated in consideration of the occurrence or nonoccurrence of dripping after 24 hours in the dripping property test. In the evaluation of the dripping property, when the dripping ratio was 0% in the dripping property test, the sample is evaluated as "A". When dripping occurred after 24 hours, the sample is evaluated as "B". When dripping did not occur after 24 hours and occurred after 96 hours, the sample is evaluated as "C".

TABLE V

| Dripping property | | Adhesive resin composition | | | | | | | | | | |
|---|---|---|---|---|---|---|---|---|---|---|---|---|
| evaluation | | No. 1 | No. 2 | No. 3 | No. 4 | No. 5 | No. 6 | No. 7 | No. 8 | No. 9 | No. 10 | No. 11 |
| Absorbed dose | 100 (kJ/kg) | B | A | A | B | B | B | B | A | B | B | — |
| | 200 (kJ/kg) | B | A | A | B | B | B | B | A | B | B | — |
| | 300 (kJ/kg) | A | A | A | B | B | B | B | A | B | B | C |
| | 400 (kJ/kg) | A | A | A | B | A | B | B | — | B | B | — |
| | 500 (kJ/kg) | A | A | A | A | A | B | B | — | B | B | — |

As shown above, regarding the adhesive resin composition No. 1, when the absorbed dose of the electron beam is 300 kJ/kg or more and 500 kJ/kg or less, the dripping ratio after 96 hours is 0%. Accordingly, it is evaluated that, even in a multilayered heat-recoverable article, the adhesive does not easily flow out from a base material layer.

Similarly, regarding the adhesive resin composition Nos. 2 and 3, when the absorbed dose of the electron beam is 100 kJ/kg or more and 500 kJ/kg or less; regarding the adhesive resin composition No. 4, when the absorbed dose of the electron beam is 500 kJ/kg; regarding the adhesive resin composition No. 5, when the absorbed dose of the electron beam is 400 kJ/kg or more and 500 kJ/kg or less; and regarding the adhesive resin composition No. 8, when the absorbed dose of the electron beam is 100 kJ/kg or more and 300 kJ/kg or less, it is evaluated that when the adhesive resin composition is used as an adhesive for a multilayered heat-recoverable article, the adhesive does not easily flow out from a base material layer after heat shrinkage.

In contrast, the adhesive resin composition No. 6, No. 7, and Nos. 9 to 11 did not have dripping properties suitable for adhesives for multilayered heat-recoverable articles within this range.

Furthermore, for each of the adhesives prepared by irradiating the adhesive resin composition Nos. 1 to 11 with an electron beam, waterproofing properties in multilayered heat-recoverable articles were evaluated by a waterproof test described below.

(Waterproof Test)

The waterproof test was conducted as follows. A wire splice prepared by using a multilayered heat-recoverable article using each of the adhesives was put in water. Air at 200 kPa was blown for 30 seconds from an end from which one PVC electric wire in the multilayered heat-recoverable article extended. Whether or not bubbles were generated from another end from which four PVC electric wires extended was examined. In the waterproof test, when bubbles were not generated, the sample was evaluated as "A". When bubbles were generated, the sample was evaluated as "B".

The wire splice used in the waterproof test was prepared as follows. One PVC electric wire was connected to four PVC electric wires by welding conductor wires thereof, and the welded portion was covered with a multilayered heat-recoverable article. In this state, the resulting electric wires were horizontally placed on a floor of a thermostatic chamber at 180° C., and heated for 90 seconds to shrink a base material layer. In the wire splice prepared as described above, one PVC electric wire extends from an end of a multilayered heat-recoverable article, and four PVC electric wires extend from another end of the multilayered heat-recoverable article.

Table VI shows evaluation results of waterproofing properties of the adhesives determined by the waterproof test.

TABLE VI

| Waterproofing property evaluation | | Adhesive resin composition | | | | | | | | | | |
|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 |
| Absorbed dose | 100 (kJ/kg) | A | A | A | A | A | A | A | B | A | A | — |
| | 200 (kJ/kg) | A | A | A | A | A | A | A | B | A | A | — |
| | 300 (kJ/kg) | A | A | A | A | A | A | A | B | A | A | A |
| | 400 (kJ/kg) | A | B | A | A | A | A | A | — | A | A | — |
| | 500 (kJ/kg) | A | B | B | A | A | A | A | — | A | A | — |

As shown above, regarding the adhesive resin composition No. 1, Nos. 4 to 7, No. 9, and No. 10, when the absorbed dose of the electron beam was 100 kJ/kg or more and 500 kJ/kg or less; regarding the adhesive resin composition No. 2, when the absorbed dose of the electron beam was 100 kJ/kg or more and 300 kJ/kg or less; regarding the adhesive resin composition No. 3, when the absorbed dose of the electron beam was 100 kJ/kg or more and 400 kJ/kg or less; and regarding the adhesive resin composition No. 11, when the absorbed dose of the electron beam was 300 kJ/kg, the adhesive had a good waterproofing property. In contrast, the adhesive resin composition No. 8 did not have a good waterproofing property in any of the cases.

Next, adhesive resin composition Nos. 12 to 14 were experimentally prepared so as to have the compositions shown in Table VII using, as resin raw materials, the polyamide (1) used in the adhesive resin composition Nos. 1 to 10, a polyamide (2) different from the polyamide (1), and a very low-density polyethylene. In Table VII, the symbol "-" means that the component is not mixed.

TABLE VII

| Component | Adhesive resin composition | | |
|---|---|---|---|
| (parts by mass) | No. 12 | No. 13 | No. 14 |
| Polyamide (1) | — | 70 | — |
| Polyamide (2) | 100 | — | 70 |
| VLDPE (C) | — | 30 | 30 |

A polyamide containing a trimer acid in an amount of 38% by mass and having an MFR of 120 g/10 min and a softening point of 93° C. was used as the raw material polyamide (2). A very low-density polyethylene (VLDPE) (C) having an MFR of 30 g/10 min, a melting point of 65° C., and a specific gravity of 0.870 g/cm$^3$ was used as the very low-density polyethylene. In each of the adhesive resin composition Nos. 12 to 14, 10 parts by mass of an oxidation inhibitor was added relative to 100 parts by mass of the resin component.

The resin component and the additive were sufficiently mixed to prepare the adhesive resin compositions. Each of the adhesive resin compositions was irradiated with an electron beam so that the absorbed dose was different. Thus, a plurality of adhesives were obtained from each of the adhesive resin compositions. The absorbed dose of the electron beam was adjusted to 100 kJ/kg, 200 kJ/kg, 300 kJ/kg, 400 kJ/kg, and 500 kJ/kg.

For each of the adhesives that were prepared by irradiating the adhesive resin composition Nos. 12 to 14 with an electron beam and that had different absorbed doses, a shear viscosity was measured as in the adhesive resin composition Nos. 1 to 11. Table VIII shows a shear viscosity of each of the adhesives at a shear rate of 0.01 s$^{-1}$. Table IX shows a shear viscosity of each of the adhesives at a shear rate of 100 s$^{-1}$.

TABLE VIII

| Shear viscosity (Pa · s) | | Adhesive resin composition | | |
|---|---|---|---|---|
| (Shear rate: 0.01 s$^{-1}$) | | No. 12 | No. 13 | No. 14 |
| Absorbed dose | 100 (KJ/Kg) | 20 | 110 | 350 |
| | 200 (KJ/Kg) | 660 | 320 | 730 |
| | 300 (KJ/Kg) | 2230 | 680 | 1520 |
| | 400 (KJ/Kg) | 3500 | 1080 | 2520 |
| | 500 (KJ/Kg) | — | — | — |

TABLE IX

| Shear viscosity (Pa·s) | 接着剤用樹脂組成物 | | |
|---|---|---|---|
| (Shear rate: 100 s$^{-1}$) | No. 12 | No. 13 | No. 14 |
| Absorbed dose 100 (KJ/Kg) | 10 | 60 | 50 |
| 200 (KJ/Kg) | 90 | 70 | 140 |
| 300 (KJ/Kg) | 160 | 80 | 170 |
| 400 (KJ/Kg) | 320 | 80 | 270 |
| 500 (KJ/Kg) | — | — | — |

As shown in Tables VIII and IX, regarding the adhesive resin composition No. 12, when the absorbed dose of the electron beam was 200 kJ/kg or more and 300 kJ/kg or less, the shear viscosity at a shear rate of 0.01 s$^{-1}$ was 300 Pa·s or more, and the shear viscosity at a shear rate of 100 s$^{-1}$ was 200 Pa·s or less. Thus, the adhesive resin composition had thixotropy suitable for an adhesive for a multilayered heat-recoverable article.

Similarly, regarding the adhesive resin composition No. 13, when the absorbed dose of the electron beam was 200 kJ/kg or more and 400 kJ/kg or less; and regarding the adhesive resin composition No. 14, when the absorbed dose of the electron beam was 100 kJ/kg or more and 300 kJ/kg or less, the adhesive resin composition had thixotropy suitable for an adhesive for a multilayered heat-recoverable article.

Next, for each of the adhesives that were prepared by irradiating the adhesive resin composition Nos. 12 to 14 with an electron beam and that had different absorbed doses, the dripping property test was conducted as in the adhesive resin composition Nos. 1 to 11. Table X shows the dripping ratio of each of the adhesives. Table XI shows a dripping property of each of the adhesives.

TABLE X

| Dripping ratio | Adhesive resin composition | | |
|---|---|---|---|
| (mass %) | No. 12 | No. 13 | No. 14 |
| Absorbed dose 100 (KJ/Kg) | 70 | 16 | 0 |
| 200 (KJ/Kg) | 0 | 0 | 0 |
| 300 (KJ/Kg) | 0 | 0 | 0 |
| 400 (KJ/Kg) | 0 | 0 | 0 |
| 500 (KJ/Kg) | 0 | 0 | 0 |

TABLE XI

| Dripping property | Adhesive resin composition | | |
|---|---|---|---|
| evaluation | No. 12 | No. 13 | No. 14 |
| Absorbed dose 100 (KJ/Kg) | B | B | A |
| 200 (KJ/Kg) | A | A | A |
| 300 (KJ/Kg) | A | A | A |
| 400 (KJ/Kg) | A | A | A |
| 500 (KJ/Kg) | A | A | A |

As shown in Tables X and XI, regarding the adhesive resin composition No. 12, when the absorbed dose of the electron beam is 200 kJ/kg or more and 500 kJ/kg or less, the dripping ratio after 96 hours is 0%. Accordingly, it is evaluated that, even in a multilayered heat-recoverable article, the adhesive does not easily flow out from a base material layer. Similarly, regarding the adhesive resin composition No. 13, when the absorbed dose of the electron beam is 200 kJ/kg or more and 500 kJ/kg or less; and regarding the adhesive resin composition No. 14, when the absorbed dose of the electron beam is 100 kJ/kg or more and 500 kJ/kg or less, it is evaluated that when the adhesive resin composition is used as an adhesive for a multilayered heat-recoverable article, the adhesive does not easily flow out from a base material layer after heat shrinkage.

Furthermore, for each of the adhesives prepared by irradiating the adhesive resin composition Nos. 12 to 14 with an electron beam, waterproofing properties in multilayered heat-recoverable articles were evaluated as in the adhesive resin composition Nos. 1 to 11. Table XII shows evaluation results of waterproofing properties of the adhesives.

TABLE XII

| Waterproofing property | Adhesive resin composition | | |
|---|---|---|---|
| evaluation | No. 12 | No. 13 | No. 14 |
| Absorbed dose 100 (KJ/Kg) | A | A | A |
| 200 (KJ/Kg) | A | A | A |
| 300 (KJ/Kg) | A | A | A |
| 400 (KJ/Kg) | B | A | B |
| 500 (KJ/Kg) | B | A | B |

As shown in Table XII, regarding the adhesive resin composition Nos. 12 and 14, when the absorbed dose of the electron beam was 100 kJ/kg or more and 300 kJ/kg or less; and regarding the adhesive resin composition No. 13, when the absorbed dose of the electron beam was 100 kJ/kg or more and 500 kJ/kg or less, the adhesive had a good waterproofing property.

The above results show that when an adhesive resin composition has a shear viscosity of 300 Pa·s or more at a shear rate of 0.01 s$^{-1}$ and a shear viscosity of 200 Pa·s or less at a shear rate of 100 s$^{-1}$, the adhesive resin composition has both a good dripping property and a good waterproofing property and has characteristics suitable for an adhesive for a multilayered heat-recoverable article.

INDUSTRIAL APPLICABILITY

The multilayered heat-recoverable article of the present invention, and the wire splice and wire harness that use the multilayered heat-recoverable article have high adhesiveness to an adherend because an adhesive moderately flows during heat shrinkage, and have high reliability because the adhesive does not easily flow out after heat shrinkage.

REFERENCE SIGNS LIST

1, 1A multilayered heat-recoverable article
1a tube
10, 10A base material layer
11, 11A adhesive layer
2 wire splice
20 wire
21 conductor wire
3 wire harness
30 wire
31 multi-pin connector
A sheet-like adhesive
P glass plate

The invention claimed is:
1. A multilayered heat-recoverable article comprising a cylindrical base material layer; and an adhesive layer formed on an inner circumferential surface of the base material layer,
wherein the adhesive layer is formed of a resin composition that contains a polyamide as a main component and that does not substantially contain an inorganic filler, the resin composition is cross-linked by irradiation with ionizing radiation, and a shear viscosity of the adhesive layer at 150° C. is 300 Pa·s or more at a shear rate of 0.01 $s^{-1}$ and 200 Pa·s or less at a shear rate of 100 $s^{-1}$.

2. The multilayered heat-recoverable article according to claim 1, wherein the resin composition contains a very low-density polyethylene in an amount of 20% by mass or more.

3. The multilayered heat-recoverable article according to claim 1, wherein the resin composition contains an ethylene copolymer in an amount of 20% by mass or more.

4. A wire splice comprising a plurality of wires each of which includes a conductor and an insulating layer formed on the outside of the conductor; and a tube adhering to a portion where the conductors of the wires are connected to each other, wherein the tube is formed by thermally shrinking the multilayered heat-recoverable according to claim 1.

5. A wire harness comprising a plurality of wires each of which includes a conductor and an insulating layer formed on the outside of the conductor; and a tube adhering to the wires, wherein the tube is formed by thermally shrinking the multilayered heat-recoverable article according to claim 1.

6. A method for producing an adhesive for a multilayered heat-recoverable article, the adhesive being formed of a resin composition that contains a polyamide as a main component and that does not substantially contain an inorganic filler, the method comprising:

a step of irradiating the resin composition with ionizing radiation, wherein a dose of the ionizing radiation is controlled so that a shear viscosity of the adhesive at 150° C. is 300 Pa·s or more at a shear rate of 0.01 $s^{-1}$ and 200 Pa·s or less at a shear rate of 100 $s^{-1}$.

7. The method for producing an adhesive for a multilayered heat-recoverable article according to claim 6, wherein the dose of the ionizing radiation absorbed by the resin composition is 90 kJ/kg or more.

8. The method for producing an adhesive for a multilayered heat-recoverable article according to claim 6, wherein the ionizing radiation is an electron beam.

* * * * *